Jan. 2, 1934.  J. P. BEM  1,941,874
HALF-FRUIT PITTING AND CORING MACHINE
Filed May 31, 1932
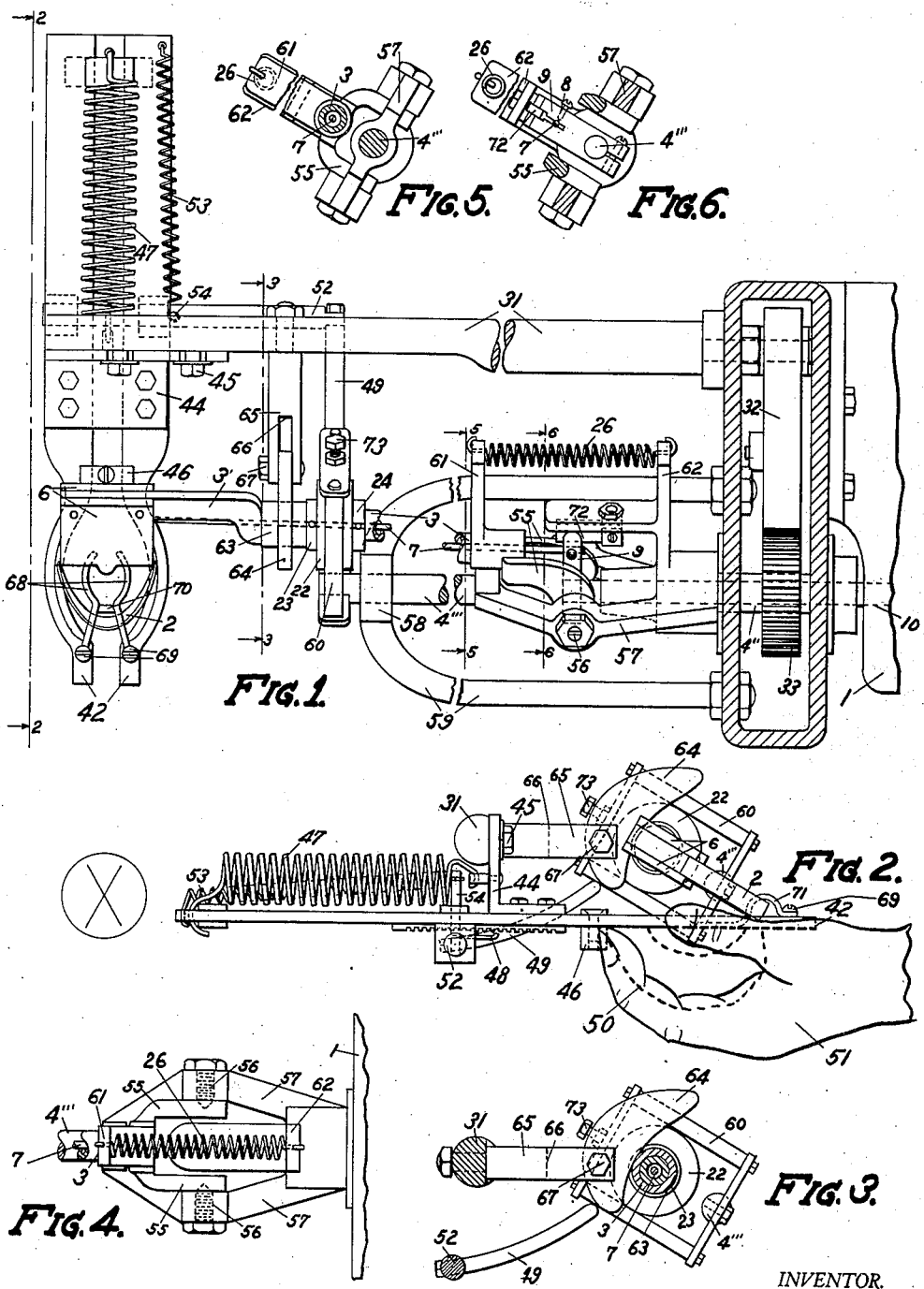
INVENTOR.
JOSEPH P. BEM
BY Miller Boyken + Bried
ATTORNEYS.

UNITED STATES PATENT OFFICE 1,941,874

HALF-FRUIT PITTING AND CORING MACHINE

Joseph P. Bem, Oakland, Calif., assignor to Pacific Pitting Machine Company Inc., Fresno, Calif., a corporation of California Application May 31, 1932. Serial No. 614,426

10 Claims. (Cl. 146—28)

This invention relates to machines for pitting or coring halved fruit, and has for its objects improved construction in the type of such machine shown in my copending patent application filed under Serial No. 492,774 on November 1, 1930, as well as means for preventing the tearing of the flesh of the fruit as the half pits are cut out. Other objects and advantages of the invention will appear in the following description and accompanying drawing.

In the drawing Fig. 1 is a plan view of the operative parts of the machine involved in the invention.

Fig. 2 is an end view of Fig. 1 as seen from the line 2—2 thereof.

Fig. 3 is a cross section of Fig. 1 as seen from the line 3—3 thereof.

Fig. 4 is a plan view of the knife shaft yoke.

Fig. 5 is a cross section taken along the line 5—5 of Fig. 1.

Fig. 6 is a cross section taken along the line 6—6 of Fig. 1.

Briefly described the present machine, similarly to the machine of my copending patent application mentioned, consists of a pedestal or main frame supporting the driving mechanism and a laterally projecting fixed arm which carries the pitting shaft and its vibrating arched blade and fruit supporting yoke against the underside of which a half peach or other half fruit is held by the hand of an operative for pitting or coring, and as the driving mechanism is completely described in the copending case referred to and is not involved in the present case only a portion of the pedestal frame is shown.

In the drawing the various parts identical with parts of the machine of the copending case aforesaid will be correspondingly numbered to show their identity therewith, and hence 1 is the pedestal frame, 31 the fixed supporting arm projecting horizontally from the pedestal at about table height so as to support the arched pitting blade 2 at a convenient height for a seated operative using it and who sits about at the point marked with an encircled cross X. This blade is a thin arched strip of steel and below it is a pair of curved arms 42 in yoke-like arrangement against the undersides of which arms the half peaches are held one by one by the hands of the operative. This yoke-like device is rigidly supported by a bracket 44 from the main supporting arm 31 and carries certain other parts 45, 46, 47, 53, 54, all as will be later described, though they are claimed in my copending application aforesaid and are not claimed as part of the present invention.

The arched blade 2 is pivotally mounted within a housing 6 at one end of a carrier arm 3 which extends in a substantially horizontal direction and is provided at its other end with a fork 55 pivoted at 56 to opposite sides 57 of a yoke connecting two aligned sections of the rotatable shaft 4" and 4"'. Section 4" of the shaft is hollow and is rocked from foot-operated gear segment 32 meshing with a gear 33 as described in the other case and likewise passes rod 10 which is longitudinally vibrated for vibrating the blade vibrating wire 7, all as described in my copending application aforesaid, but continuing section 4'" of the shaft is new and this is additionally rotatably supported near its outer end by a bearing 58 at the end of an arm or arms 59 and is not hollow as the blade vibrating wire 7 does not pass through it but passes through a portion 3 of blade carrier arm which is made hollow to receive it. The outer end of the wire attached to the blade rocking connections not shown and the inner end is connected at 8 to a short arm 9 secured in turn to the outer end of the reciprocatory rod 10 in the manner described in the copending case mentioned.

An important feature of the present construction is the guiding yoke 60 now carried by and on the outer end of the outer shaft section 4'". This yoke is a rectangular frame firmly secured to the flattened end of shaft 4'" and embraces a free roller 22 on carrier arm 3 so that the arm 3 and the pitting blade are free to move up and down from pivots 56 within the limits of the yoke, but under the resilient effect of a tension spring 26 connected at opposite ends respectively to rearwardly projecting lugs 61, 62 respectively on fork 55 and yoke 57 which tends to pull the arched pitting blade 2 outward or upward from yoke arms 42 or against the curved part of the pit of the half fruit 50 held under the arms 42 by the hand 51 of the operative. Carrier arm 3 is turned with the turning of shaft 4'" through the fork connection 55 as well as by the yoke 60 and this brings the latter at right angles to the plane of arms 42 at about the center of the cutting stroke of the blade.

Blade carrier 3 is provided with an idler roller 63 just to the left of collar 23 arranged to swing against a cam 64 (see Figs. 2 and 3) upon rocking of the blade shaft and carrier so as to modify the cut of the blade in the fruit, and particularly its entry into the fruit from the initial or starting point shown in Fig. 2. This cam is carried on a small bracket 65 projecting from main supporting arm 31 and is adjustable to various angles in a slot 66 at the end of the bracket by means of a screw 67 so that any shape or change in cut may be had, or the cam may be swung out of the way to let the pit alone determine the shape of the cut by the hugging action of the blade against its outer curved side from the pull of spring 26.

When the half-fruit 50 is held against the under side of the yoke arms 42 by the hand 51 of an operative, the end of the fruit touches a slide or stop 46 slidably guided between the yoke arms and resiliently pulled forward by a light spring 47. This slide is for supporting the fruit against the rearward dragging action of the coring blade. The forward end of this slide extends below the under surface of arms 42 as shown in Fig. 2 and is normally so far forward under the action of spring 47 that it must be pushed back more or less by the tip of each fruit-half in adjusting the same in proper position for the blade 2 to enter just ahead of the forward end of the pit, and the moment the coring blade starts to swing, this slide 46 is at once locked in whatever position it happens to be in, by means of a small spring latch 48 mounted on a small rotatable shaft 52 in turn rotatably supported from bar 31 and provided at its other end with a forwardly projecting arm 49 contacted by one of the guides of yoke 60 (at the beginning of the cutting stroke only as shown in Fig. 2) to thus release the latch from engagement with the teeth of a small rack (see Fig. 2) secured to the under side of an extension of the slide to the rear end of which the spring 47 connects, but to permit the latch to engage the rack the moment the blade begins to swing and thus lock the slide. The small latch shaft 52 is normally urged to rotate in a direction to cause latch 48 by means of a light spring 53 hooked at one end to the rearward extension of one of the arms 42 and at its forward end to a pin 54 projecting from the side of the shaft.

As the blade comes up and out of the fruit it has been found to sometimes tear the meat of the fruit instead of cutting through the last vestige of meat. This is now overcome by a small finger which steadies the half pit from on top. Figs. 1 and 2 show the finger which consists preferably of two pieces of wire 68 given a yoke-like form and positioned between arms 42 so as to just press against the pit when the half fruit is pressed against the underside of the arms 42. The outer ends of the wire finger are firmly secured to the arms as by screws 69 and the wires are preferably braced together as at 70. The form of the pit steadying finger is important in elevation as seen in Fig. 2 as it is given an upward curve at 71 to clear the blade 2 at the beginning of its stroke downward through the flesh of the fruit and around the half pit. It will be understood that this finger may be of any size to suit the grade or size of fruit and pits being operated on, and in case of coring pears it is also valuable and may be elongated to suit and the cam 64 given a shape to cut out the elongated core desired as there would then be no pit to guide the blade. The finger being in the form of a wire loop preserves visibility of the pit from above, which is necessary for positioning the fruit for pitting.

Another feature in the present case is the provision of guide 72 on an extension of lug 62 operating in a slot in the end of arm 9 so that the arm will be prevented from twisting as it is reciprocated at high speed on its rod 10.

Still another feature is the provision of a set screw 73 at the outer end of yoke 60 which may be adjusted to limit the inward movement of the blade carrier 3 under the action of spring 26.

As the machine will cut out cores as well as pits, the words "pits" and "pitting" used in the claims are to be taken as also covering cores and coring.

Having thus described my improved construction, what I claim is:—

1. In a machine for pitting fruit, a curved blade formed to cut out the core of a half-fruit, a carrier arm on which the blade is mounted, a revolvable shaft extending generally along said carrier arm, means pivoting the carrier arm to the shaft at a point remote from said blade to permit bodily swinging of the blade toward and from the axis of said shaft, a yoke carried by the shaft embracing said carrier arm, a device on the carrier guided in said yoke, a cam firmly positioned at a point between said yoke and said blade, arranged to control the movement of said carrier arm when swinging and revolving the same by said shaft.

2. In a machine of the character described, a revolvable shaft, a carrier arm pivoted at one end in offset relation to the axis of said shaft, a curved blade formed to cut out the core of a half-fruit carried by the other end of the carrier arm, means mounting said blade for vibratory movement, a wire extending along said carrier arm for vibrating said blade, an axially movable rod extending axially in a bore in said shaft, an offset arm on the rod connected to said wire, and additional means guiding the crank for reciprocating movement.

3. In a construction as specified in claim 2, bearing support for said shaft at both sides of its pivotal connection to said carrier.

4. In a machine for pitting fruit, a curved blade formed to cut out the core of a half-fruit, a carrier arm at one end of which the blade is mounted, a revolvable shaft extending in the general direction in which said arm extends, a yoke interposed in the length of said shaft, means pivoting said carrier arm to said yoke for movement of said blade toward and from the axis of said shaft, and means resiliently urging said carrier arm to swing in a direction away from said axis.

5. In a machine for pitting fruit, a curved blade formed to cut out the core of a half-fruit, a carrier arm at one end of which the blade is mounted, a revolvable shaft extending in the general direction in which said arm extends, a yoke interposed in the length of said shaft, means pivoting said carrier arm to said yoke for movement of said blade toward and from the axis of said shaft, and means resiliently urging said carrier arm to swing in a direction away from said axis, said carrier arm forked at one end and pivoted at the fork ends to the sides of the yoke.

6. In a machine for pitting fruit, a curved blade formed to cut out the core of a half-fruit, a carrier arm at one end of which the blade is mounted, a revolvable shaft extending in the general direction in which said arm extends, a yoke interposed in the length of said shaft, means revolvably supporting said shaft at points beyond both ends of said yoke, means pivoting said carrier arm to said yoke for movement of said blade toward and from the axis of said shaft, and means resiliently urging said carrier arm to swing in a direction away from said axis.

7. In a machine for removing the half-pits from bisected fruit, means arranged to bear upon the margin of the flat face of the fruit-half for supporting the fruit-half during pitting and having an opening exposing the half-pit, a curved blade arranged to swing through said opening and around the half-pit and cut the same from the flesh of the fruit, and a finger arranged to bear upon the cut face of the half-pit to prevent undue tearing of the flesh of the fruit as the blade emerges therefrom, said finger formed with an offset to permit the blade to swing clear of the flesh of the fruit and plane of the fruit supporting surface.

8. In a machine for removing the half-pits from bisected fruit, means arranged to bear upon the margin of the flat face of the fruit-half for supporting the fruit-half during pitting and having an opening exposing the half-pit, a curved blade arranged to swing through said opening and around the half-pit and cut the same from the flesh of the fruit, and a finger arranged to bear upon the cut face of the half-pit to prevent undue tearing of the flesh of the fruit as the blade emerges therefrom, said finger formed with an offset to permit the blade to swing clear of the flesh of the fruit and plane of the fruit supporting surface at both ends of the stroke of the blade.

9. In a machine for removing the half-pits from bisected fruit, means arranged to bear upon the margin of the flat face of the fruit-half for supporting the fruit-half during pitting and having an opening exposing the half-pit, a curved blade arranged to swing through said opening and around the half-pit and cut the same from the flesh of the fruit, and a wire loop arranged to bear upon the cut face of the half-pit to prevent undue tearing of the flesh of the fruit as the blade emerges therefrom, said wire loop formed with an offset to permit the blade to swing clear of the flesh of the fruit and plane of the fruit supporting surface.

10. In a construction as specified in claim 7, said finger mounted upon the fruit-half supporting means so as to be fixed in relation thereto.

JOSEPH P. BEM.